(12) United States Patent
Lin et al.

(10) Patent No.: US 9,576,336 B2
(45) Date of Patent: Feb. 21, 2017

(54) DISPLAY METHOD AND DISPLAY DEVICE

(71) Applicant: INSTITUTE FOR INFORMATION INDUSTRY, Taipei (TW)

(72) Inventors: Ching-Wen Lin, New Taipei (TW); Hsiang-Chun Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 144 days.

(21) Appl. No.: 14/549,558

(22) Filed: Nov. 21, 2014

(65) Prior Publication Data

US 2016/0055619 A1  Feb. 25, 2016

(30) Foreign Application Priority Data

Aug. 22, 2014  (TW) .............................. 103129004 A

(51) Int. Cl.
  *G06T 3/00* (2006.01)
  *G06T 11/00* (2006.01)
(52) U.S. Cl.
  CPC ........... *G06T 3/0056* (2013.01); *G06T 11/001* (2013.01)
(58) Field of Classification Search
  CPC G09G 5/391; G09G 2340/0407; G09G 5/377; H04N 13/0429; G06T 2207/20144
  See application file for complete search history.

(56) References Cited

U.S. PATENT DOCUMENTS

| 7,907,200 B2* | 3/2011 | Yanagisawa | G02B 27/0101 345/7 |
| 9,026,946 B2* | 5/2015 | Mujkic | G06F 9/4443 715/838 |
| 2010/0141784 A1* | 6/2010 | Yoo | H04N 5/23219 348/222.1 |
| 2012/0068913 A1* | 3/2012 | Bar-Zeev | G02B 26/026 345/8 |
| 2013/0038627 A1* | 2/2013 | Mujkic | G06F 9/4443 345/619 |

FOREIGN PATENT DOCUMENTS

| CN | 102540463 A | 7/2012 |
| CN | 203433191 U | 2/2014 |

OTHER PUBLICATIONS

The 1st examination report of the corresponding Taiwan application issued on Mar. 25, 2016.

* cited by examiner

*Primary Examiner* — Antonio A Caschera
(74) *Attorney, Agent, or Firm* — CKC & Partners Co., Ltd.

(57) ABSTRACT

A display method for displaying an image on a transparent display component of a display device includes receiving a display content, determining a background resolution of the image, selecting one of background images as a first background image based on the display content and the background resolution, performing image processing on the first background image to generate a second background image, adding the display content to the second background image to generate the image, and displaying the image on the transparent display component.

20 Claims, 9 Drawing Sheets

FIRST BACKGROUND IMAGE   SECOND BACKGROUND IMAGE

SECOND BACKGROUND IMAGE    DISPLAY CONTENT    IMAGE

+   Cat   =

DISPLAY METHOD AND DISPLAY DEVICE

RELATED APPLICATIONS

This application claims priority to Taiwan Application Serial Number 103129004, filed on Aug. 22, 2014, which is herein incorporated by reference.

BACKGROUND

Field of Disclosure

The invention relates to a display method and a display device performing the display method, and more particularly, to a display method and a display device that can reduce computing power.

Description of Related Art

In the evolution of the manufacture and computation technology, it becomes possible to display real-time images and informative contents on traditional wearable devices such as smart glasses and watches. Significant attentions have been focused on such novel wearable devices for being applicable to various industries such as military, aviation, medical care, game, recreation, and sports.

However, taking smart glasses as an example, if it is desired to display clear images or words on the lens, effects of the ambient light source must be taken into consideration, while the light source varies with a situation of a user continuously. In general, a wearable device detects an intensity level of an ambient light source through a light sensor, and the intensity level of the ambient light source penetrating through the lens are adjusted by adding shading devices, such that the user may see clear images or information on lens regardless of the variation of the ambient light source. In other words, during the adjustment of the light source, the light sensor has to detect the ambient light source continuously, and the computation device embedded in the wearable device also has to compute a corresponding light adjusting value continuously, thus consuming a large amount of computational resources and power.

However, for taking wearable devices into consideration, weights and sizes of the wearable devices are strictly limited, i.e., the computing capabilities and energy storage of the wearable devices are limited. The existing display technologies consume large amount of power, thus reducing the usable time and product practicability of wearable devices. Therefore, how to use limited resources for displaying real-time information on wearable devices has become one of the major issues in the industries.

SUMMARY

It is therefore a primary objective of the invention to provide a display method and a display device applying the display method.

One aspect of the invention is to provide a display method for displaying an image on a transparent display component of a display device. The display method includes receiving a display content, determining a background resolution of the image, selecting one of plural background images as a first background image based on the display content and the background resolution, performing image processing on the first background image to generate a second background image, adding the display content to the second background image to generate the image, and displaying the image on the transparent display component.

Another aspect of the invention is to provide a display device, which includes a transparent display component, a storage unit and a processing unit. The transparent display component is configured to display an image. The storage unit is configured to store background images. The processing unit is configured to receive a display content, determine a background resolution of the image, select one of the background images as a first background image based on the display content and the background resolution, perform image processing on the first background image to generate a second background image, and add the display content to the second background image to generate the image.

The display method and corresponding display device can reduce computing power and power consumption, and thus prolong usable time and reducing hardware requirements of the display device.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following description, the disclosure will be explained with reference to embodiments thereof. However, these embodiments are not intended to limit the disclosure to any specific environment, applications or particular implementations described in these embodiments. Therefore, the description of these embodiments is only for the purpose of illustration rather than to limit the disclosure. In the following embodiments and attached drawings, elements not directly related to the disclosure are omitted from depiction; and the dimensional relationships among individual elements in the attached drawings are illustrated only for ease of understanding, but not to limit the actual scale.

Figure 1:
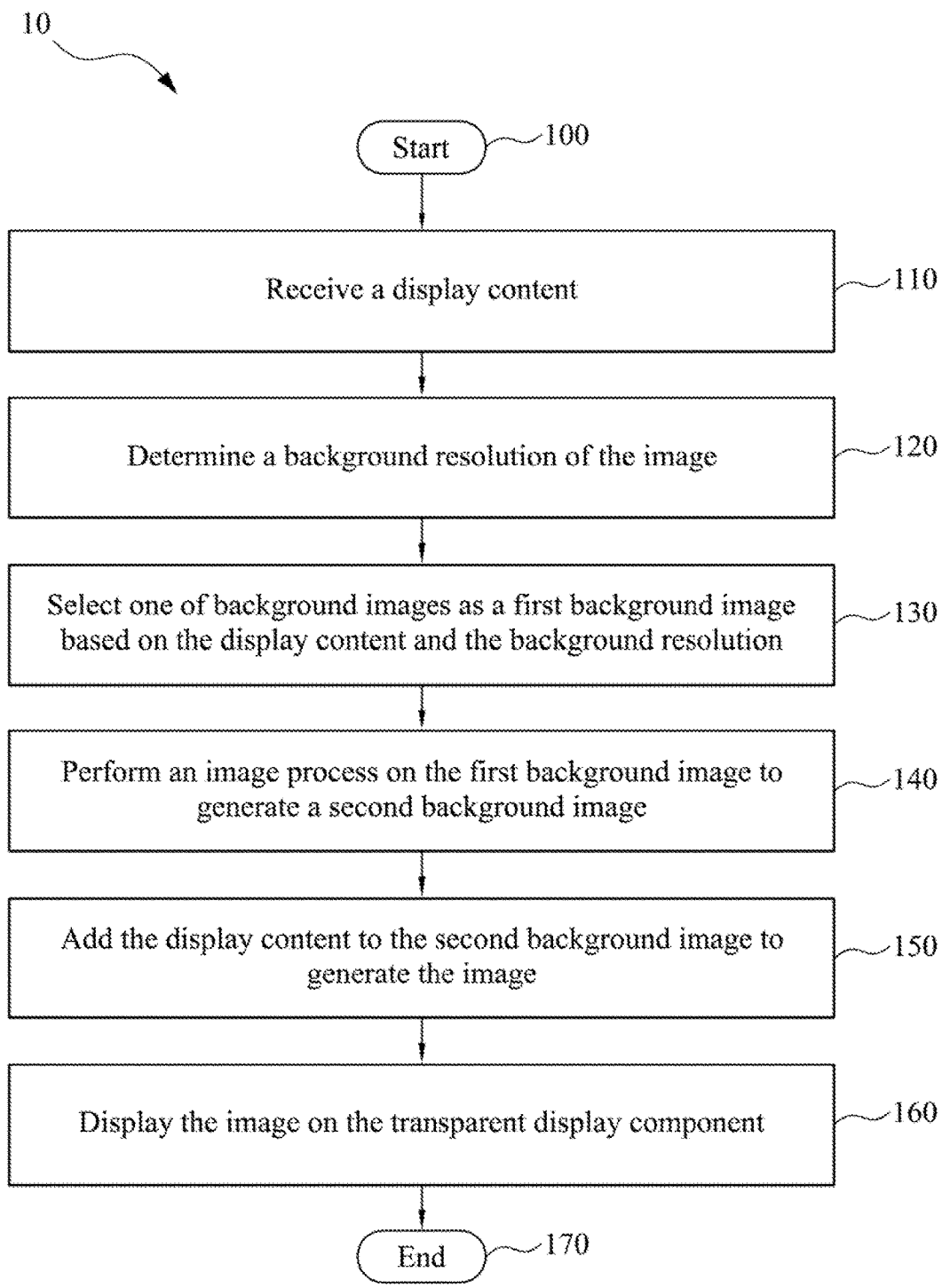
FIG. 1 illustrates a flowchart diagram of a display method according to one embodiment of the invention.
Figure 2A:
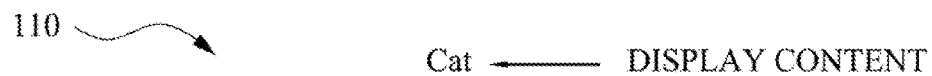
FIGS. 2A through 2F illustrate processing procedures of the display method shown in FIG. 1.
Figure 2B:
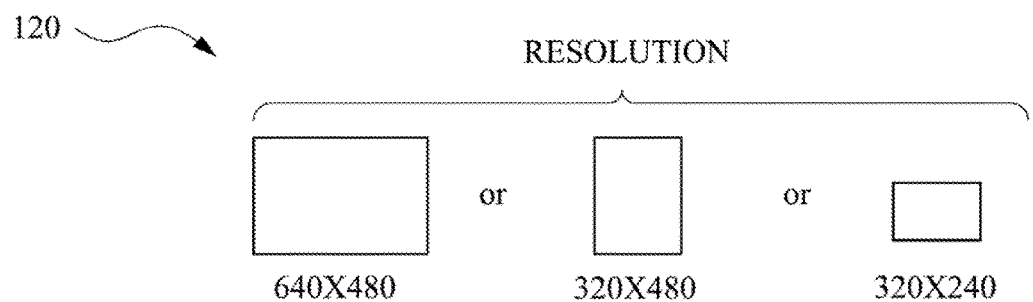
Figure 2C:
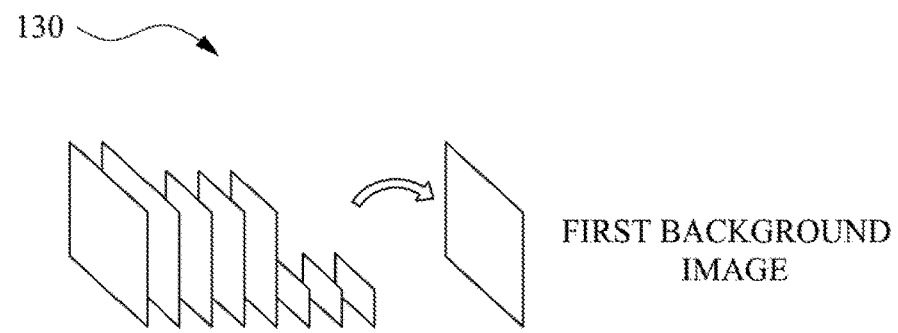
Figure 2D:
Figure 2D:
Figure 2D:
Figure 2D:
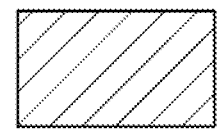
Figure 2E:
Figure 2E:
Figure 2E:
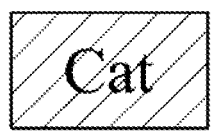
Figure 2F:
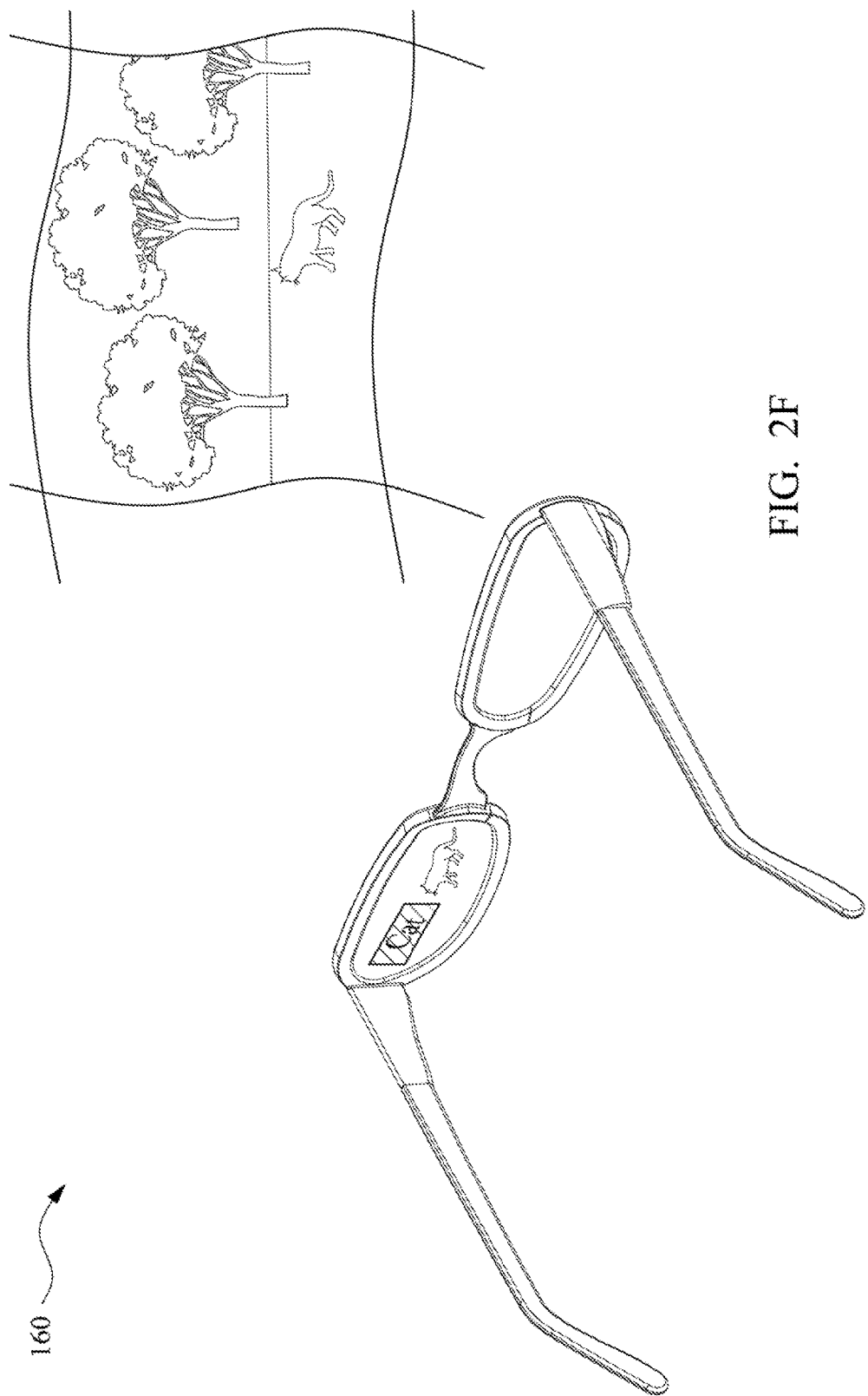

Referring to FIG. 1, FIG. 1 illustrates a flow chart of a display method 10 according to one embodiment of the invention. The display method 10 is used to display an image on a transparent display component (e.g. lens, see-through type display interface) of a display device such as a wearable device and a display device thereon. The display method 10 includes the following steps:

step 100: starting the display method 10;

step 110: receiving a display content;

step 120: determining a background resolution of the image;

step 130: selecting one of background images as a first background image based on the display content and the background resolution;

step 140: performing image processing on the first background image to generate a second background image;

step 150: adding the display content to the second background image to generate the image;

step 160: displaying the image on the transparent display component; and step 170: ending the display method 10.

In the display method 10, the contrast ratio effect of the display content to the background is enhanced through selecting a background image from the pre-stored background images as the first background image and then performing further image processing on the first background image. Thereafter, the display content (e.g. text, picture, icon, or a combination thereof) is directly added to the second background image to become the image eventually displayed on the transparent display component.

Referring to FIGS. 2A through 2F, FIGS. 2A through 2F respectively illustrate processing procedures of steps 110 to 160. It is noted that, in step 140, the first background image is blurred by image processing, such that scenes behind the lens cannot be seen by users directly, and the display content can become clearer. In the prior arts, the display devices need continuous operations along with the variation of scenes to generate different background images for excluding interferences from the scenes, so as to display texts clearly. On the contrary, in the invention, the display method 10 only needs to be performed once rather than continuous operations, such that the interferences from scenes can be long-term excluded to display texts clearly, therefore reducing computing power and power consumption significantly, and then reducing hardware requirements of display devices, prolonging life time of devices and improving the applicability of wearable devices.

In detail, step 120 may be performed to determine the background resolution based on the resolution of the transparent display component. For example, if the resolution of the transparent display device is 640×480 pixels, the background resolution may be selected to be 640×480 pixels (100% coverage of the transparent display component), 320×480 pixels (50% coverage) or 320×240 pixels (25% coverage), but is not limited thereto.

In addition, step 120 may also be performed to receive inputs from a user and determine the background resolution based on the coverage ratio selected by the user.

For displaying the contents more dearly, preferably, step 130 may be performed to determine a contrast color (e.g. color contrast or level contrast) based on the color of the display contents, so as to have strong contrast between the contrast color and the color of the display content, and then to select one background image from the candidate background images as the first background image, in which the color of the first background image is nearest to the contrast color, and the size the first background image matches with the background image with the background resolution. As such, the display content can be displayed on the transparent display component more clearly.

Furthermore, at step 130, if the candidate background images do not have the background image which matches with the background resolution, the background image of which color is nearest to the contrast color may be cropped directly to become the first background image, such that the resolution of first background image is equivalent to the background resolution.

In addition to selecting the background image based on the color of the display content, step 130 also may be performed to receive a user's input, and then to select one background image from the candidate background images as the first background image of which color is nearest to the color selected by the user.

Similarly, at step 130, if the candidate background images do not have the background image which matches with the background resolution of which color is selected by the user, the background image of which color is nearest to the contrast color may be cropped directly to become the first background image of which color is nearest to the color selected by the user, such that the resolution of first background image is equivalent to the background resolution.

Figure 3:
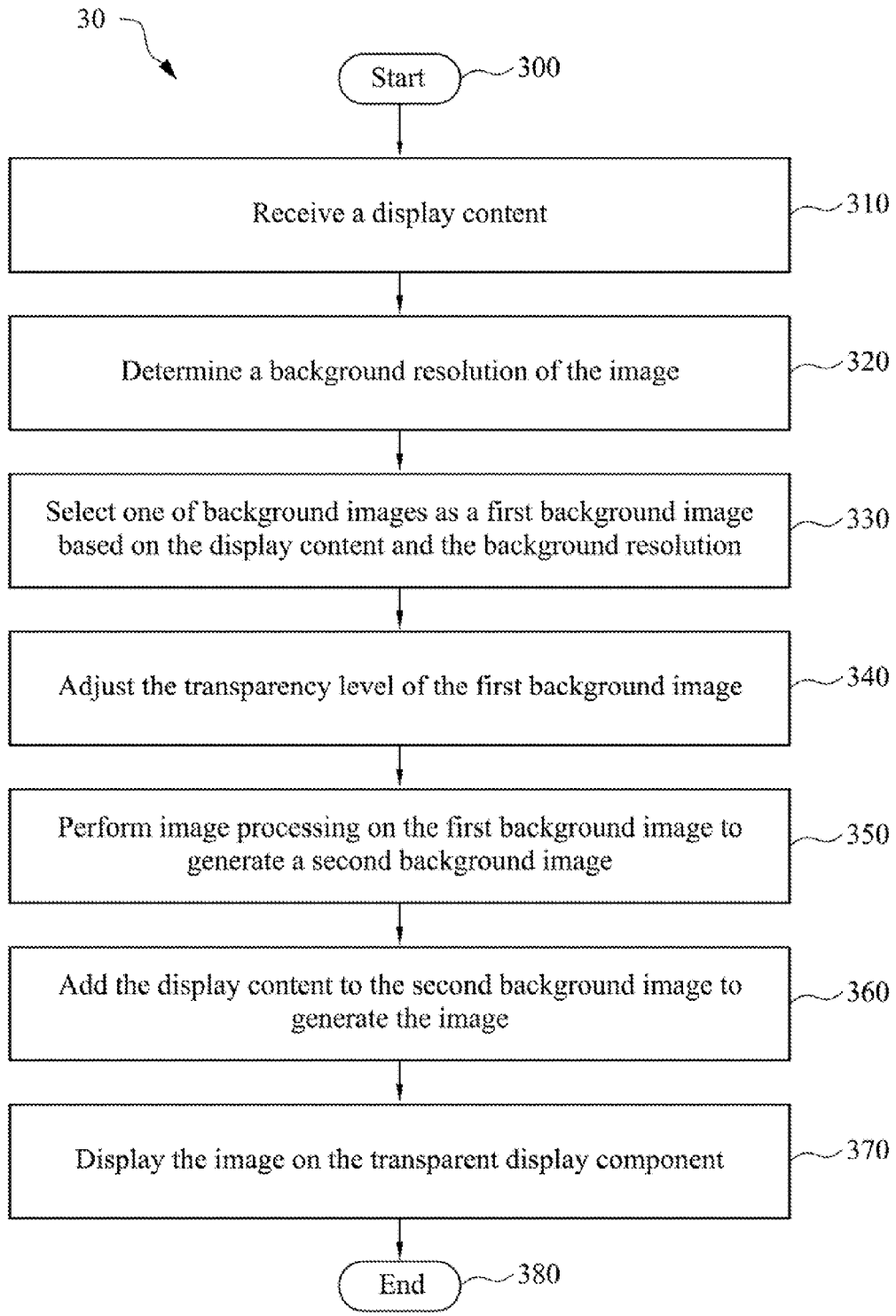
FIG. 3 illustrates a flow chart of a display method according to another embodiment of the invention.

In addition to selecting the color of the background image, for further reducing interferences of environmental scenes to the display content, new steps may be added between step 130 and step 140 of the display method to adjust the transparency level of the first background image, that is, a display method 30 (referring to FIG. 3) including:

step 300: starting the method 30;

step 310: receiving a display content;

step 320: determining a background resolution of the image;

step 330: selecting one of background images as a first background image based on the display content and the background resolution;

step 340: adjusting the transparency level of the first background image;

step 350: performing image processing on the first background image to generate a second background image;

step 360: adding the display content to the second background image to generate the image;

step 370: displaying the image on the transparent display component; and step 380: ending the method 30.

Figure 4:
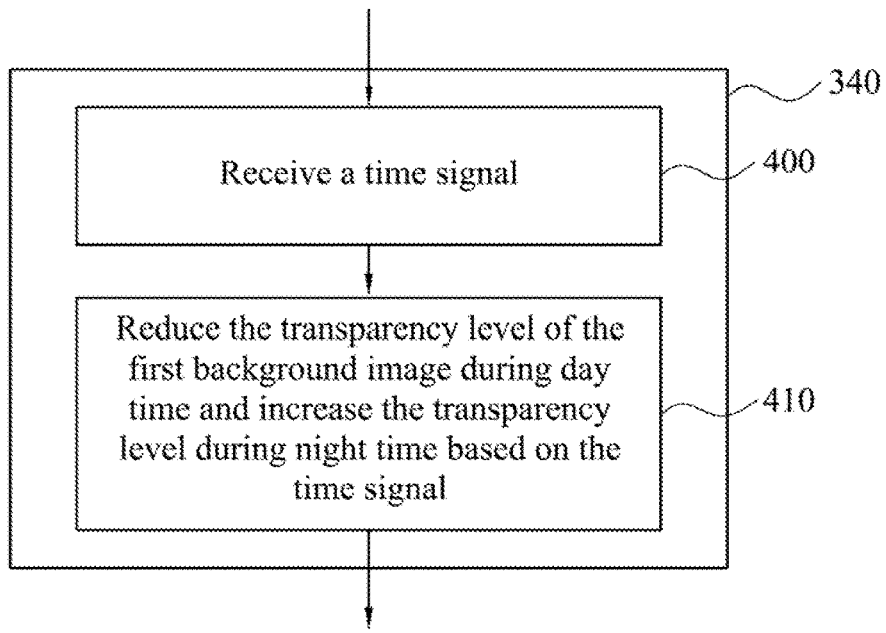
FIG. 4 illustrates a sub-flow chart of the flow chart shown in FIG. 3.

In detail, referring to FIG. 4, in another embodiment of the invention, the newly-added step 340 includes the following sub-steps:

step 400: receiving a time signal; and step 410: reducing the transparency level of the first background image during day time and increase the transparency level during night time based on the time signal.

The display device receives the time signal, and can determine whether the present time is day time or night time based on the time signal. As such, when the ambient light source is strong in day time, the first background image with low transparency level can shade strong light of the environmental scenes to keep the display content clear. Oppositely, when the ambient light source is weak in night time, the interferences of the environmental scenes to the display content are small, and thus the transparency level of the first background image can be improved.

Figure 5:
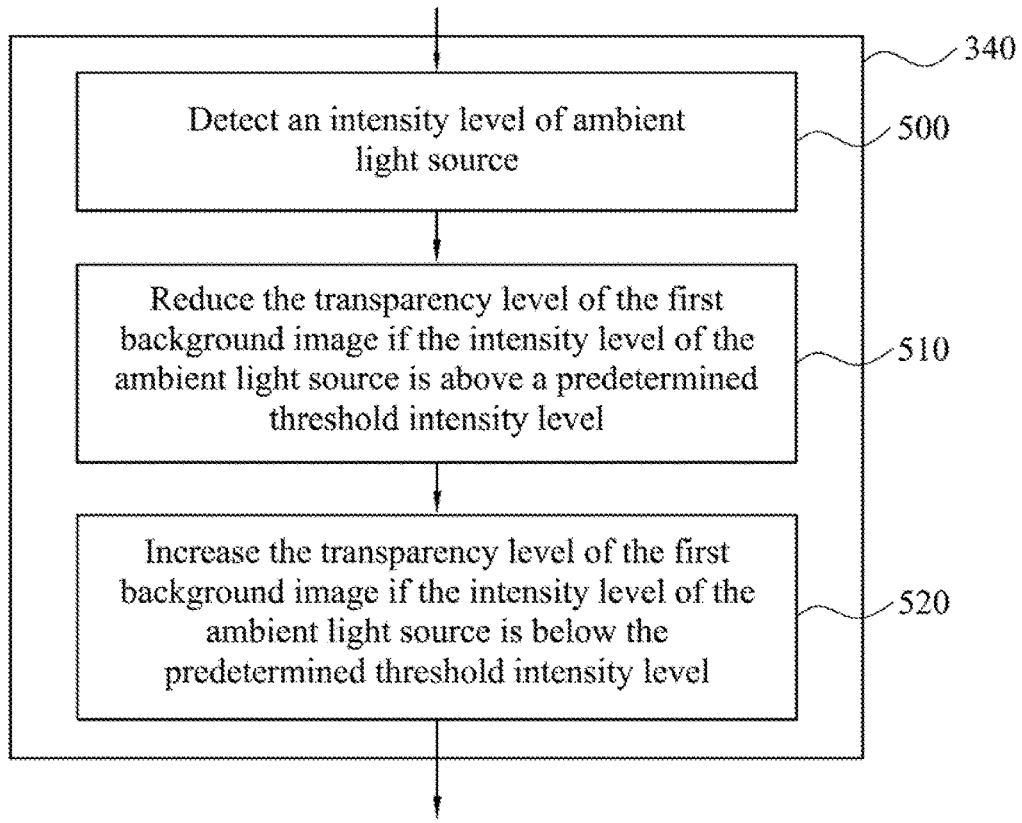
FIG. 5 illustrates another sub-flow chart of the flow chart shown in FIG. 3.

In addition to the basis of time, referring to FIG. 5, in another embodiment of the invention, step 340 may include the following sub-steps:

step 500: detecting an intensity level of the ambient light source;

step 510: reducing the transparency level of the first background image if the intensity level of the ambient light source is above a predetermined threshold intensity level; and step 520: increasing the transparency level of the first background image if the intensity level of the ambient light source is below the predetermined threshold intensity level.

That is, the display device may actively detect the intensity level of the ambient light source through an embedded or external light sensor as foundation of adjusting the transparency level of the first background image.

Figure 6:
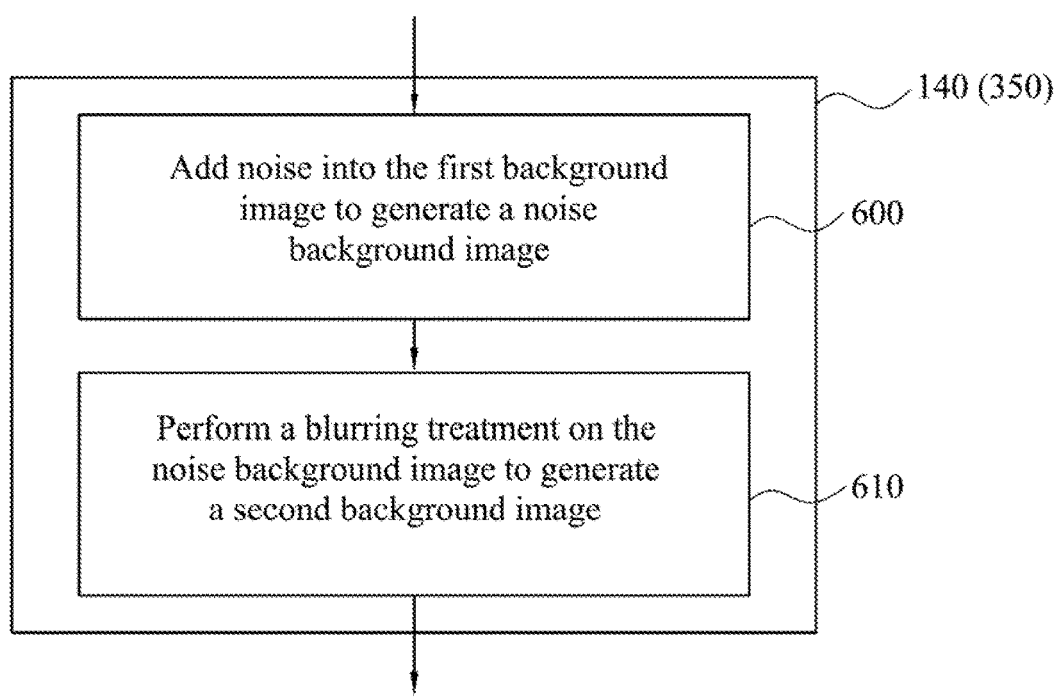
FIG. 6 illustrates another sub-flow chart of the flow chart shown in FIG. 1 and FIG. 3.

Further, referring to FIG. 6, the image processing of steps 140 and 350 include:

step 600: adding noise into the first background image to generate a noise background image; and step 610: performing a blurring treatment on the noise background image to generate a second background image.

In detail, the added noise may be white noise, Gaussian noise, speckle noise, pink noise, Brownian noise, blue noise or violet noise. The blurring treatment may be a Gaussian blur treatment, a color channel blur treatment or a motion blur treatment.

As such, by adding the noise and the blurring treatment, the second background image may further shade the environmental scenes, such that the display content becomes clearer.

Figure 7:
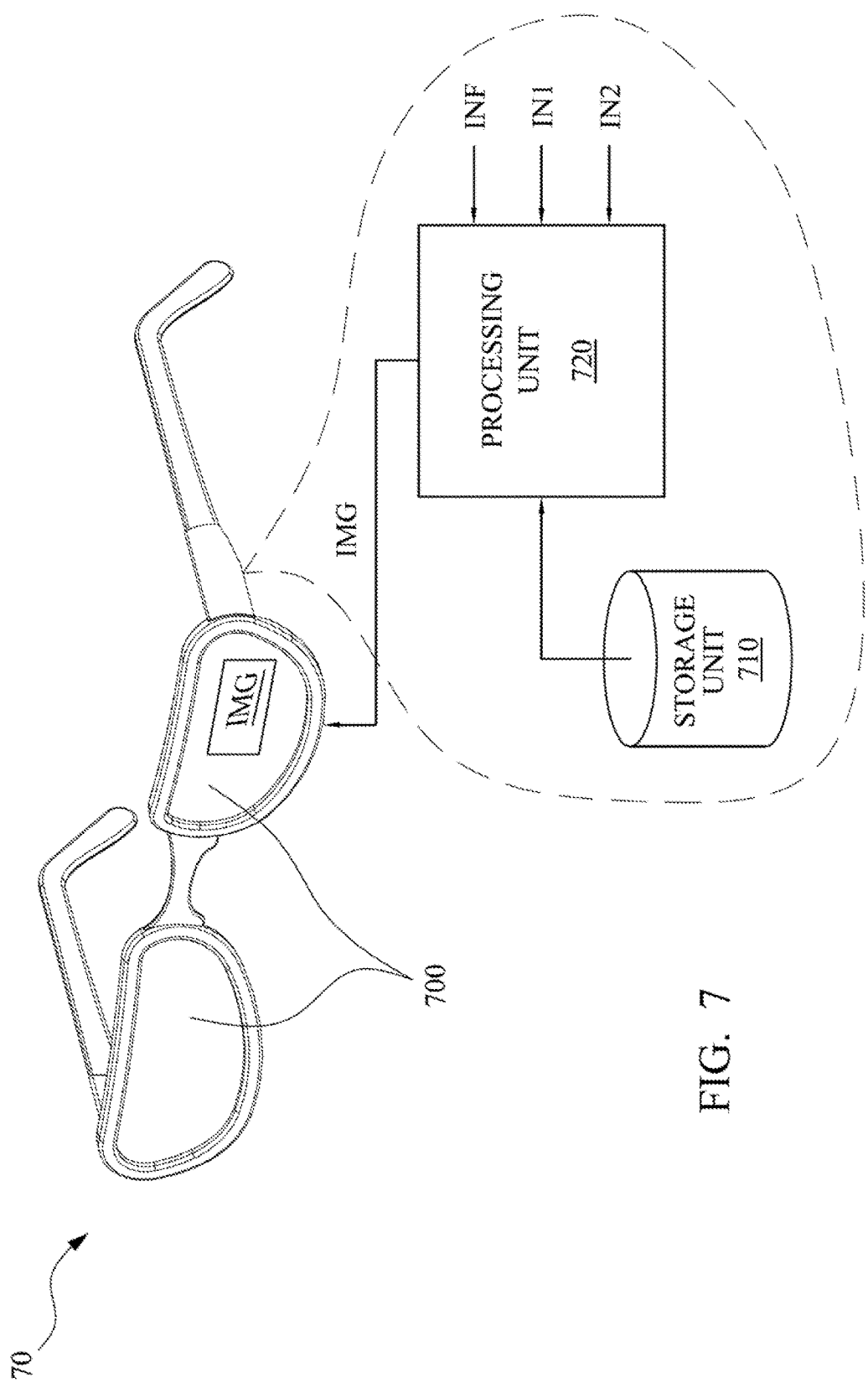
FIG. 7 is a schematic diagram of a display device according to one embodiment of the invention.

For realizing the display method 10, the invention provides a display device (e.g. wearable device and display device thereon). Referring to FIG. 7, FIG. 7 is a schematic diagram of a display device 70 according to one embodiment of the invention. The display device 70 includes a transparent display component 700, a storage unit 710 and a processing unit 720. The transparent display component 700 is configured to display an image IMG. The storage unit 710 is configured to store background images. The processing unit 720 is configured to generate a display content, determine a background resolution of the image IMG, select one of the background images as a first background image based on the display content and the background resolution, perform image processing on the first background image to generate a second background image, and add the display content to the second background image to generate the image IMG.

In detail, corresponding to step 110, the processing unit 720 receives an information signal INF as the display content. Corresponding to step 120, the processing unit 720 determines the background resolution based on the resolution of the transparent display device 700 or receives a first input signal IN1 as the background resolution. Related details can be referred to the description of step 120, and thus are not repeated herein.

Corresponding to step 130, the processing unit 720 determines a contrast color based on the color of the display content and selects one of the background images as the first background image based on the display content and the background resolution. Related details can be referred to the description of step 130, and is not repeated herein.

Corresponding to another embodiment of step 130, the processing unit 720 also receives a second input signal IN2, which may be from inputting to the display device by a user. Then, the processing unit 720 selects one of the background images to become the first background image based on the second input signal IN2. Related details can be referred to the description of step 130, and thus are not repeated herein.

The operational details of the processing unit 720 corresponding to steps 140 to 160 can refer to the description of step 130, and is not repeated herein.

Figure 8:
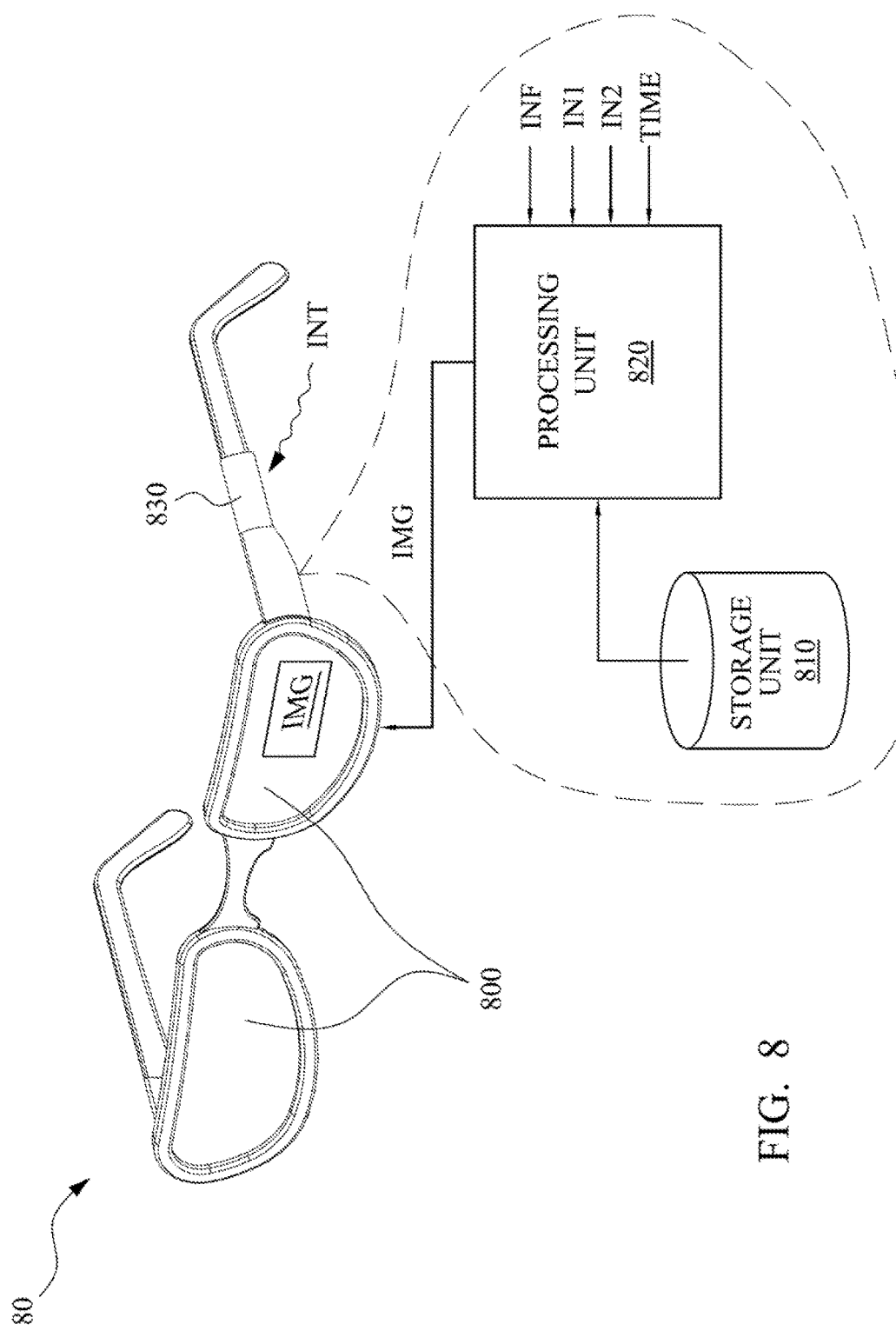
FIG. 8 is a schematic diagram of a display device according to another embodiment of the invention.

Similarly, for realizing the display method 30, the invention provides a display device. Referring to FIG. 8, FIG. 8 is a schematic diagram of a display device 80 according to one embodiment of the invention. The functionalities of the display device 80 (e.g. wearable device or display device thereon) are similar to those of the display device 70, and the difference therebetween is that the display device 80 further receives a time signal TIME as foundation of reducing the transparency level of the first background image during day time and increasing the transparency level of the first background image during night time for performing steps 340, 400 and 410 of the display method 30.

Furthermore, for performing steps 340 and 500 through 520 of the display method 30, the display device 80 further includes a light sensor 830 for detecting an intensity level of ambient light source INT. If the intensity level of the ambient light source INT is above a threshold intensity level, the processing unit 820 reduces the transparency level of the first background image. If the intensity level of the ambient light source INT is below the threshold intensity level, the processing unit 820 increases the transparency level of the first background image.

Except for the processing unit 820 and the light sensor 830, the other elements (e.g., a transparent display component 800 and a storage unit 810) of the display device 80 are the same as those of the display device 70, and thus are not repeated herein.

To sum up, in the invention, a desired image is generated by adding a display content to a stored background image directly. Therefore, the invention can reduce computing power and power consumption, and thus prolong usable time and reducing hardware requirements of the display device.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A display method for displaying an image on a transparent display component of a display device, the display method comprising:
   receiving a display content by a processing unit;
   determining a background resolution of the image by the processing unit;
   selecting one of a plurality of background images as a first background image based on the display content and the background resolution by the processing unit;
   performing image processing on the first background image to generate a second background image by the processing unit;
   adding the display content to the second background image to generate the image by the processing unit; and
   displaying the image on the transparent display component by the processing unit.

2. The display method of claim 1, wherein the step of determining the background resolution comprises:
   determining the background resolution based on a resolution of the transparent display component by the processing unit.

3. The display method of claim 1, wherein the step of selecting one of the background images as the first background image based on the display content and the background resolution comprises:
   determining a contrast color based on a color of the display content by the processing unit; and
   selecting one of the background images as the first background image based on the contrast color and the background resolution by the processing unit.

4. The display method of claim 3, wherein the step of selecting one of the background images as the first background image based on the contrast color and the background resolution further comprises:
   cropping the selected background image to become the first background image based on the background resolution, such that the first background image has a resolution equivalent to the background resolution by the processing unit.

5. The display method of claim 1, wherein the step of selecting one of the background images as the first background image based on the display content and the background resolution comprises:
   receiving an input signal by the processing unit;
   selecting one of the background images to become the first background image based on the input signal by the processing unit; and
   cropping the selected background image to become the first background image, such that the first background image has a resolution equivalent to a display resolution by the processing unit.

6. The display method of claim 1, furthering comprising:
   adjusting a transparency level of the first background image by the processing unit, wherein the step of adjusting the transparency level of the first background image comprises:
      receiving a time signal by the processing unit; and
      reducing the transparency level during day time and increasing the transparency level during night time based on the time signal by the processing unit.

7. The display method of claim 1, furthering comprising:
   adjusting a transparency level of the first background image by the processing unit, wherein the step of adjusting the transparency level of the first background image comprises:
      detecting an intensity level of ambient light source by the processing unit;
      reducing the transparency level if the intensity of the ambient light source is above a threshold intensity level by the processing unit; and
      increasing the transparency level if the intensity of the ambient light source is below the threshold intensity level by the processing unit.

8. The display method of claim 1, wherein the step of performing the image processing comprises:
   adding noise into the first background image to generate a noise background image by the processing unit; and
   performing a blurring treatment on the noise background image to generate a second background image by the processing unit.

9. The display method of claim 8, wherein the noise is white noise, Gaussian noise, speckle noise, pink noise, Brownian noise, blue noise or violet noise.

10. The display method of claim 8, wherein the blurring treatment is a Gaussian blur treatment, a color channel blur treatment or a motion blur treatment.

11. A display device, comprising:
   a transparent display component configured to display an image;
   a storage unit configured to store a plurality of background images; and
   a processing unit configured to perform the following steps:
      receiving a display content;
      determining a background resolution of the image;
      selecting one of the background images as a first background image based on the display content and the background resolution;
      performing image processing on the first background image to generate a second background image; and
      adding the display content to the second background image to generate the image.

12. The display device of claim 11, wherein the processing unit is further configured to receive an information signal as the display content.

13. The display device of claim 11, wherein the processing unit is further configured to determine the background resolution based on a resolution of the transparent display component.

14. The display device of claim 11, wherein the processing unit is further configured to perform the following steps:
   determining a contrast color based on a color of the display content;
   selecting one of the background images as the first background image based on the contrast color and the background resolution; and
   cropping the selected background image to become the first background image based on the background resolution, such that the first background image has a resolution equivalent to a display resolution.

15. The display device of claim 11, wherein the processing unit is further configured to perform the following steps:
   receiving an input signal; and
   selecting one of the background images as the first background image based on the input signal.

16. The display device of claim 15, wherein the processing unit is further configured to perform the following step:
   cropping the selected background image to become the first background image, such that the first background image has a resolution equivalent to a display resolution.

17. The display device of claim 11, wherein the processing unit is further configured to perform the following steps:
   adjusting a transparency level of the first background image;
   receiving a time signal; and
   reducing the transparency level during day time and increasing the transparency level during night time based on the time signal.

18. The display device of claim 11, further comprising a light sensor for detecting an intensity level ambient light source;
   wherein the processing unit is further configured to adjust a transparency level of the first background image, receive a time signal, and reduce the transparency level during day time and increase the transparency level during night time based on the time signal; and
   wherein the processing unit is further configured to reduce the transparency level if the intensity level of the ambient light source is above a threshold intensity level and increasing the transparency level if the intensity level of the ambient light source is below the threshold intensity level.

19. The display device of claim 11, wherein the processing unit is further configured to perform the following steps:
   adding noise into the first background image to generate a noise background image; and
   performing a blurring treatment on the noise background image to generate a second background image.

20. The display device of claim 19, wherein the noise is white noise, Gaussian noise, speckle noise, pink noise, Brownian noise, blue noise or violet noise.

* * * * *